United States Patent
Tang et al.

(10) Patent No.: US 12,127,066 B2
(45) Date of Patent: Oct. 22, 2024

(54) SERVICE CONTINUITY FOR PDU SESSION ANCHOR RELOCATION

(71) Applicant: LENOVO (BEIJING) LIMITED, Beijing (CN)

(72) Inventors: Tingfang Tang, Beijing (CN); Genadi Velev, Darmstadt (DE)

(73) Assignee: Lenovo (Beijing) Limited, Beijing (CN)

( * ) Notice: Subject to any disclaimer, the term of this patent is extended or adjusted under 35 U.S.C. 154(b) by 269 days.

(21) Appl. No.: 17/765,380

(22) PCT Filed: Sep. 30, 2019

(86) PCT No.: PCT/CN2019/109431
§ 371 (c)(1),
(2) Date: Mar. 30, 2022

(87) PCT Pub. No.: WO2021/062622
PCT Pub. Date: Apr. 8, 2021

(65) Prior Publication Data
US 2022/0377637 A1    Nov. 24, 2022

(51) Int. Cl.
*H04W 36/22* (2009.01)
*H04W 28/08* (2023.01)
*H04W 36/00* (2009.01)

(52) U.S. Cl.
CPC ........... *H04W 36/22* (2013.01); *H04W 28/08* (2013.01); *H04W 36/0011* (2013.01)

(58) Field of Classification Search
CPC . H04W 36/22; H04W 28/08; H04W 36/0011; H04W 4/24; H04M 15/8033; H04M 15/8228; H04M 15/66; H04M 15/8038; H04L 12/1407
See application file for complete search history.

(56) References Cited

U.S. PATENT DOCUMENTS

| | | | |
|---|---|---|---|
| 11,765,584 B2 * | 9/2023 | Yuan | H04W 36/12 726/3 |
| 2018/0279180 A1 | 9/2018 | Lee et al. | |
| 2019/0007500 A1 | 1/2019 | Kim et al. | |
| 2019/0053117 A1 * | 2/2019 | Bae | H04W 36/125 |
| 2020/0329008 A1 * | 10/2020 | Dao | H04L 61/5007 |

(Continued)

FOREIGN PATENT DOCUMENTS

| | | |
|---|---|---|
| CN | 109548186 A | 3/2019 |
| WO | 2019160546 A1 | 8/2019 |

OTHER PUBLICATIONS

Choi, Young-il, and Jae Ho Kim. "Reliable data transmission in 5G Network using Access Traffic Steering method." 2020 International Conference on Information and Communication Technology Convergence (Ictc). IEEE, 2020. (Year: 2020).*

(Continued)

*Primary Examiner* — Sharad Rampuria
(74) *Attorney, Agent, or Firm* — Kunzler Bean & Adamson

(57) ABSTRACT

Method and apparatus for improving the flexibility of supporting service continuity are disclosed. A method comprises receiving a PCC rule containing a traffic steering control information per AF request which includes an indication on whether service continuity for offload traffic is supported or not; and performing a PSA relocation based on the information.

17 Claims, 9 Drawing Sheets

Local access to the same DN

(56) References Cited

U.S. PATENT DOCUMENTS

2021/0099943 A1* 4/2021 Dannebro ............... H04L 67/63
2021/0314266 A1* 10/2021 Li ........................... H04L 47/20

OTHER PUBLICATIONS

Liang, Bin, Mark A. Gregory, and Shuo Li. "Service-driven User Plane Architecture for Future Cellular Networks and Multi-access Edge Computing." 2023 33rd International Telecommunication Networks and Applications Conference. IEEE, 2023. (Year: 2023).*

International Searching Authority, "Written Opinion of the International Searching Authority," PCT/CN2019/109431, Jun. 23, 2020, pp. 1-3.

Samsung, Update of Solution 5.2, Solution Evaluation for Local Network Offloading Solutions and Update of Interim Agreements on KI #4, 5 and 6, SA WG2 Meeting #118, S2-166704, Nov. 14-18, 2016, pp. 1-8, Reno, Nevada, USA.

3GPP, 3rd Generation Partnership Project; Technical Specification Group Services and System Aspects; System Architecture for the 5G System; Stage 2; (Release 15), 3GPP TS 23.501 V15.2.0 (Jun. 2018), pp. 1-217.

3GPP, 3rd Generation Partnership Project; Technical Specification Group Services and System Aspects; Procedures for the 5G System; Stage 2; (Release 16), 3GPP Ts 23.502 V16.2.0 (Sep. 2019), pp. 1-525.

3GPP, 3rd Generation Partnership Project; Technical Specification Group Services and System Aspects; Telecommunication management; Charging management; 5G data connectivity domain charging; stage 2 (Release 16), 3GPP TS 32.255 V16.2.0 (Sep. 2019), pp. 1-76.

NTT DOCOMO, "Fixing clause number reference", 3GPP Draft; S2-1903847, Feb. 8-12, 2019, pp. 1-12, Xian, P.R. China.

3GPP, 3rd Generation Partnership Project; Technical Specification Group Services and System Aspects; Study on Enhancing Topology of SMF and UPF in 5G Networks (Release 16), 3GPP TR 23/726 V2.0.0 (Dec. 2018), pp. 1-96.

* cited by examiner

Local access to the same DN

SERVICE CONTINUITY FOR PDU SESSION ANCHOR RELOCATION

FIELD

The subject matter disclosed herein generally relates to wireless communications, and more particularly relates to supporting service continuity for PDU Session Anchor relocation.

BACKGROUND

The following abbreviations are herewith defined, at least some of which are referred to within the following description: Third Generation Partnership Project (3GPP), European Telecommunications Standards Institute (ETSI), Frequency Division Duplex (FDD), Frequency Division Multiple Access (FDMA), Long Term Evolution (LTE), New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Uplink (UL), Evolved Node B (eNB), Next Generation Node B (gNB), Downlink (DL), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED), Organic LED (OLED), Orthogonal Frequency Division Multiplexing (OFDM), Radio Resource Control (RRC), Reference Signal (RS), Single Carrier Frequency Division Multiple Access (SC-FDMA), Time-Division Duplex (TDD), Time Division Multiplex (TDM), User Entity/Equipment (Mobile Terminal) (UE), Universal Mobile Telecommunications System (UMTS), Worldwide Interoperability for Microwave Access (WiMAX), Protocol Data Unit (PDU), PDU Session Anchor (PSA), data network (DN), Service and Session Continuity (SSC), Data Network (DN), DN Access Identifier (DNAI), uplink classifier (UL classifier or ULCL), User Plane Function (UPF), Branching Point (BP), Session Management Function (SMF), Policy Control Function (PCF), Network Exposure Function (NEF), Application Function (AF), Unified Data Repository (UDR), 5G core (5GC), Policy and Charging Control (PCC).

A PDU session is used for exchanging PDU packets between UE and DN. In order to support selective traffic routing to the DN or to support SSC mode 3, a single PDU session may be associated with multiple PDU session anchors (PSAs), as described in 3GPP TS 23.501 and 23.502.

To support multiple PSAs, uplink classifier (UL classifier or ULCL) or IPv6 multi-homing is necessary. The usage of UL classifier functionality for a PDU session and the usage of an IPv6 multi-homing for a PDU session are described in clause 5.6.4 of 3GPP TS 23.501. The forwarding tunnel processing for session continuity upon ULCL relocation are described in clause 4.3.5.7 of 3GPP TS 23.502.

FIG. 1 illustrates an architecture for the ULCL. An ULCL is implemented in a UPF (shown as UPF Uplink Classifier in FIG. 1). The ULCL may apply filtering rules (e.g. to examine the destination IP address or Prefix of UL IP packets sent by the UE) and determine how the packets should be routed to different PDU session anchors. The PDU session anchor (PSA) is also implemented in a UPF (shown as UPF PDU session anchor 1 and UPF PDU session anchor 2 in FIG. 1). Each PDU session anchor may provide a different access to the same DN (deployed in the same or different positions). The data packets from UE will be transmitted to ULCL (UPF Uplink Classifier) via AN, and routed by the ULCL to different PSAs (e.g. UPF PDU session anchor 1 and UPF PDU session anchor 2 in FIG. 1), and transmitted to the DN via different PSAs. Note that two "DN"s are illustrated in FIG. 1. They are the same DN deployed at different locations. The usage of ULCL applies to PDU session type of IPv4 or IPv6 or IPv4v6. Incidentally, when data packets are received from different PSAs, the ULCL merges the received packets and transmitted the merged data packets to the UE via the AN.

In case of PDU session type of IPv6, multi-homed PDU session is also supported as illustrated in FIG. 2. A PDU session may be associated with multiple IPv6 prefixes. The data packets with different IPv6 prefixes will be branched out at a common UPF (which may be referred to as a Branching Point (BP), shown as "UPF Branching Point" in FIG. 2) to different PDU session anchors (e.g. PDU session anchor 1 and UPF PDU session anchor 2 in FIG. 2). The branching is made based on source prefixes of the PDU packets (which may be selected by the UE based on routing information and preferences received from the network).

In the above usage of ULCL or Branching Point, when the ULCL and/or the BP and/or the PSAs are to be changed (e.g. relocated) due to various reasons (e.g. UE mobility, load balance etc.), there is an issue of service continuity for the offload traffic via the additional PSA. Some data packets for the PDU session may be lost during the relocation of the ULCL and/or the BP and/or the PSAs. For example, when a PSA and/or a ULCL and/or a BP is relocated, the user plane path for the offload traffic via the additional PSA to a DN will be relocated. Source PSA and/or source ULCL and/or source BP may be released before completion of data transportation thereon. In this condition, some data transportation may be lost, which means that service continuity (or seamless service continuity) for the offload traffic via the additional PSA is not fulfilled. Some application may require seamless data transportation, i.e. no data loss is allowed. This can be achieved by releasing source PSA and/or source ULCL and/or source BP after completion of data transportation thereon, which may occupy resources thereon. On the other hand, other application may not be sensitive to data loss. It is preferable to release resources on source PSA and/or source ULCL and/or source BP as early as possible. The present application aims to provide a method to improve the flexibility of supporting service continuity (or seamless service continuity) for the offload traffic via the additional PSA. For the seamless service continuity used in this application other terms like (seamless) session continuity upon additional PSA relocation, (seamless)session continuity upon local PSA relocation, etc may be used.

BRIEF SUMMARY

Method and apparatus for improving the flexibility of supporting service continuity are disclosed.

In one embodiment, a method comprises receiving a PCC rule containing a traffic steering control information per AF request which includes an indication on whether service continuity for offload traffic is supported or not; and performing a PSA relocation based on the information.

In one embodiment, the PCC rule is received from PCF. In addition, the indication may be included in AF request received from an AF as an independent parameter or an extension to a parameter "Application Relocation Possibility".

In another embodiment, the indication is included in an acknowledge response to the PSA relocation.

In some embodiment, when the indication indicates that the service continuity for offload traffic is supported and a source PSA is relocated to a target PSA, if the source PSA is connected to a source ULCL or BP and the target PSA is connected to a target ULCL or BP, a forwarding tunnel is established between the source ULCL or BP and the target ULCL or BP. The forwarding tunnel may be released when the target ULCL or BP receives one or more end marker packets In some embodiment, when the indication indicates that the service continuity for offload traffic is supported and a source PSA is relocated to a target PSA, if the source PSA and the target PSA are both connected to a source ULCL or BP, the source PSA is released after the source ULCL or BP receives one or more end marker packets from the source PSA.

In one embodiment, when the indication indicates that the service continuity for offload traffic is not supported and a source PSA is changed to a target PSA, if the source PSA is connected to a source ULCL or BP and the target PSA is connected to a target ULCL or BP, the source PSA and the source ULCL or BP are released immediately after the target PSA and the target ULCL or BP are established.

In another embodiment, when the indication indicates that the service continuity for offload traffic is not supported and a source PSA is changed to a target PSA, if the source PSA and the target PSA are both connected to a source ULCL or BP, the source PSA is released immediately after the target PSA is established.

In yet another embodiment, when a source PSA is relocated to a target PSA where a BP is used to support data transmissions through multiple PSAs, the method further comprising: notifying a UE of a first IPv6 prefix assigned for the target PSA; and notifying the UE of a valid lifetime value for a second IPv6 prefix assigned for the source PSA. When the indication indicates that the service continuity for offload traffic is not supported, the valid lifetime value for the second IPv6 prefix assigned for the source PSA is set to zero.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which:

FIGS. 4A-4J illustrate user plane path change;

DETAILED DESCRIPTION

Figure 1:
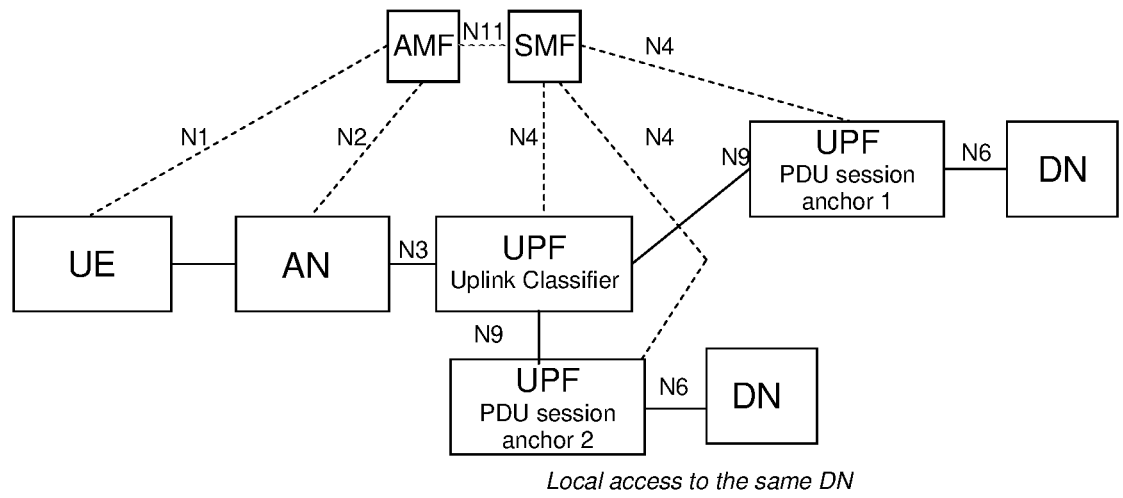
FIG. 1 illustrates a architecture for the uplink classifier.
Figure 2:
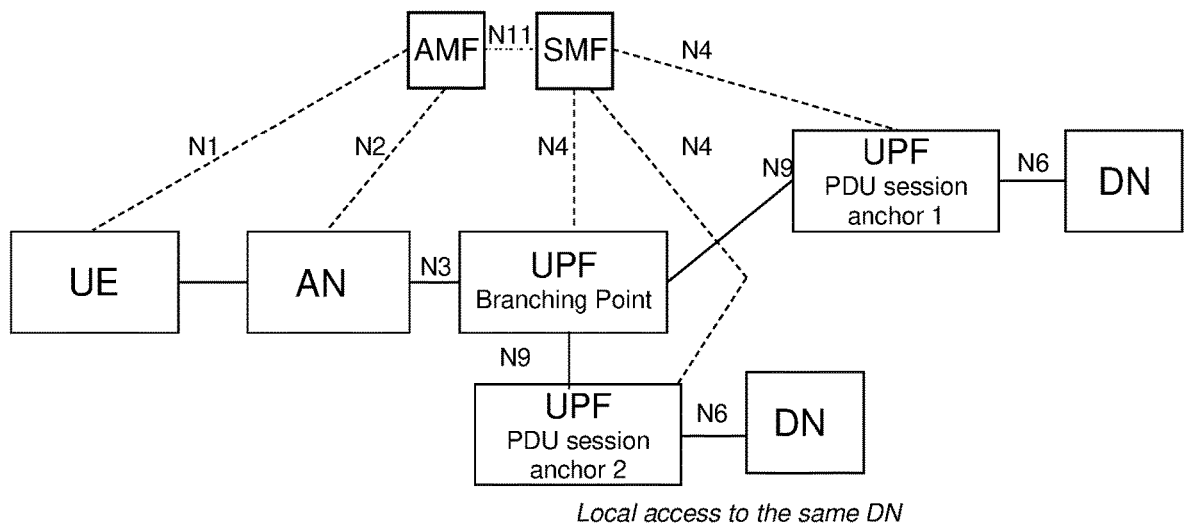
FIG. 2 illustrates a architecture for multi-homed PDU session.

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

The present application aims to improve the flexibility of supporting service continuity. This is achieved by introducing a parameter to indicate whether the service continuity for offload traffic is supported or not. When service continuity for offload traffic is supported for a relocation of PSAs and/or ULCLs and/or BPs, a seamless user data transportation should be fulfilled, that is, no data loss is allowed for the relocation of PSAs and/or ULCLs and/or BPs. On the other hand, when service continuity for offload traffic is not supported for a relocation of PSAs and/or ULCLs and/or BPs, data loss is allowed. The PSA mentioned is the additional PSA for transmitting offload traffic. Detailed embodiments are described in detail.

Figure 3:
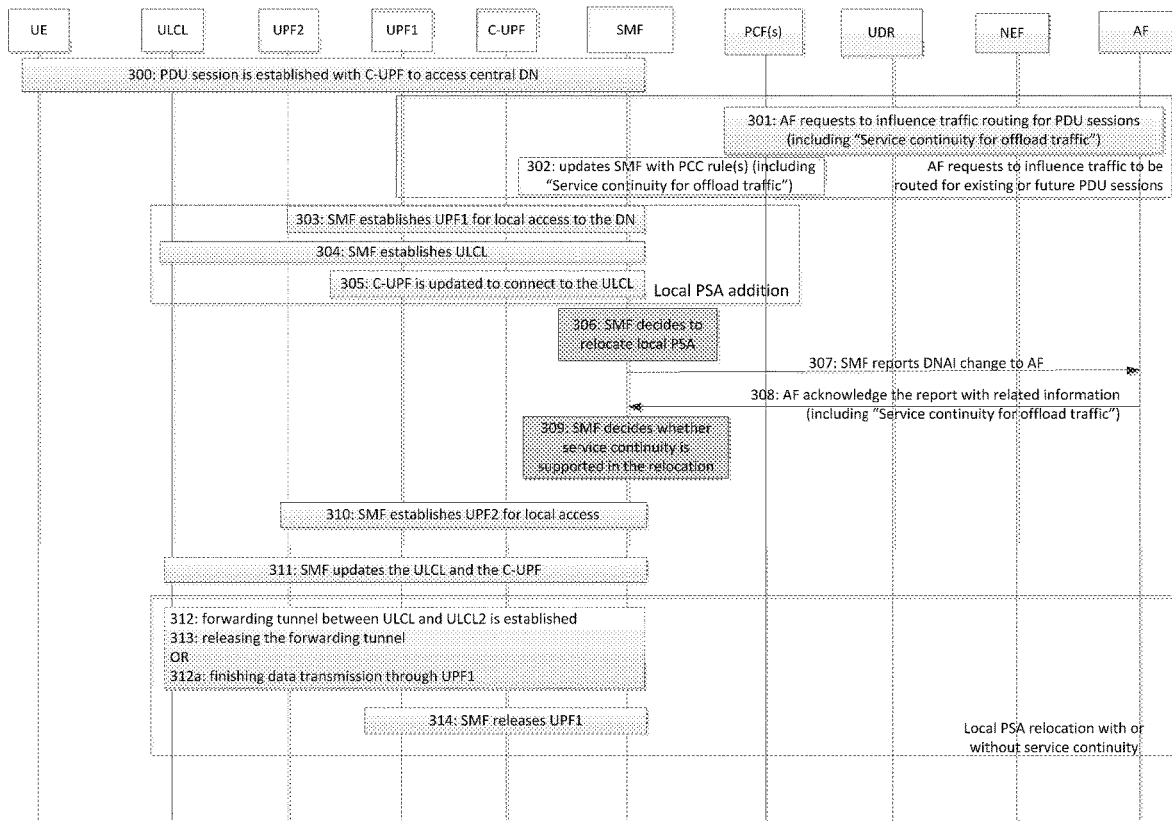
FIG. 3 illustrates a method of relocating local PSA for a PDU session according to a first embodiment.

FIG. 3 illustrates a method of relocating local PSA for a PDU session according to a first embodiment. FIGS. 4A-4J illustrate the user plane path change. In the first embodiment, uplink classifier (ULCL) is used for routing data packets to different PSAs and merging data packets received from different PSAs.

As shown in FIG. 3, various entities are included. The UE is connected via an AN (access network, not shown in FIG. 3) to the ULCL. The source local PSA is UPF1; the target local PSA is UPF2; the central PSA is C-UPF. SMF is a network function to perform the process. PCF(s), UDR, NEF and AF, that are involved in supporting service continuity, will be discussed later.

Figure 4A:
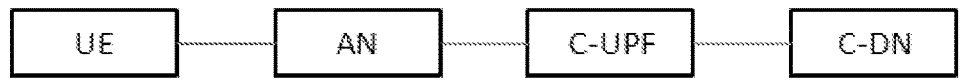

In step 300, a PDU session is established from the UE with the C-UPF to access a central DN (shown as C-DN in each of FIGS. 4A-4J). The central DN is a central deployment of a DN. The central DN is not shown in FIG. 3. As described earlier with reference to FIG. 1, the UE is connected to UPF via the AN. The AN is omitted in FIG. 3. Incidentally, if the AN cannot connect the C-UPF directly, one or more intermediate UPFs may be present between the AN and the C-UPF. The connection among the UE, the AN, the C-UPF and the C-DN is shown in FIG. 4A.

In step 301, the AF may request to influence traffic routing for PDU sessions. The AF request influences UPF selection (or reselection) and allows routing user traffic to a local access to a data network (identified by a DNAI). The AF request includes a parameter "Application Relocation Possibility", among other parameters. The parameter "Application Relocation Possibility" indicates whether an application can be relocated once a location of the application is selected by the 5GC. According to the present application, a new parameter "service continuity for offload traffic" for indicating whether service continuity for offload traffic is supported or not may be introduced into the parameters of the AF request. As an alternative to be an independent parameter, the indication on whether service continuity for offload traffic is supported or not may be implemented as an extension to the existing parameter "Application Relocation Possibility". For example, when application relocation is possible, the parameter "Application Relocation Possibility" may be extended to "Application relocation is possible with Service continuity for offload traffic supported or not supported".

In step 302, the AF request is sent to PCF directly or via NEF. The PCF determines if existing PDU sessions are potentially impacted by the AF request. For each of the existing PDU Sessions, the PCF updates the SMF with corresponding new PCC rule(s) by invoking "Npcf_SMPolicyControl_UpdateNotify" service operation. The PCC rule, that is transmitted by the PCF and received by the SMF, contains a traffic steering control information per AF request which includes the indication on whether service continuity for offload traffic is supported or not. Accordingly, the indication on whether service continuity for offload traffic is supported or not, either as an independent parameter "service continuity for offload traffic" or as an extension to the existing parameter "Application Relocation Possibility" contained in the AF request, can be known by the SMF by updating the PCC rule(s).

As a whole, in steps 301 and 302, the AF request including at least an indication on whether service continuity for offload traffic is supported or not is sent to the PCF and the related PCC rule(s) is/are updated to the SMF. The service continuity for offload traffic (supported or not supported) may influence traffic to be routed for existing or future PDU sessions. The information from the AF request including at least the indication on whether service continuity for offload traffic is supported or not may be also transmitted and stored in UDR. When a future session is established, the SMF may obtain the information from the information stored in the UDR and know the indication on whether service continuity for offload traffic is supported or not. According to the first embodiment, when the service continuity for offload traffic is supported, no data loss is allowed for the offload traffic of the PDU sessions when the PSA and/or the ULCL are relocated. When the service continuity for offload traffic is not supported, some data loss is allowed for offload traffic of the PDU sessions when the PSA and/or the ULCL are relocated. Incidentally, the service continuity for offload traffic may be the service continuity for local offload traffic.

In step 303, based on network environment and policy, the SMF decides that some selective traffic should be routed to the DN via local PSA. Accordingly, for the PDU session, the SMF establishes UPF1 for a local access to a local DN (shown as L-DN in each of FIGS. 4B-4J) for the PDU session. The local DN is a local deployment of the DN.

In step 304, the SMF establishes a ULCL for the PDU session to support data transportation through multiple PSAs (i.e. UPF1 and C-UPF). The ULCL routes the data packets from the UE via the AN to different PSAs (C-UPF or UPF1). The ULCL also merges the data packets received from different PSAs (C-UPF or UPF1) and sends the merged data packets to the UE via the AN.

In step 305, the C-UPF is updated so that the C-UPF is connected to the ULCL for the PDU session.

Figure 4B:
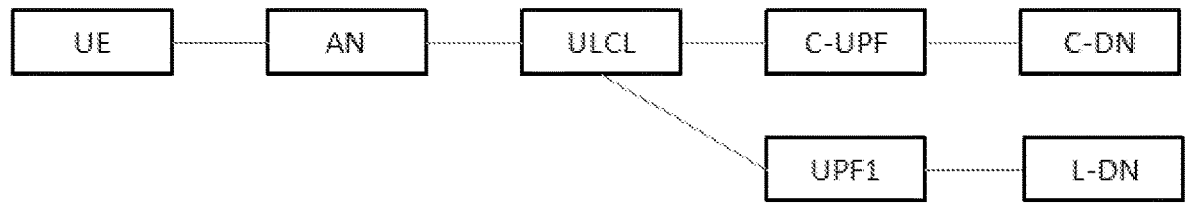

As a whole, in steps 303 to 305, a local PSA (i.e. UPF1) as well as a ULCL are updated for the PDU session, so that the UE can access the DN (L-DN) with a new user plane path through UPF1. FIG. 4B shows the connection among the UE, the AN, the ULCL, the C-UPF, the C-DN, the UPF1 and the L-DN.

In step 306, the SMF decides to relocate the local PSA (e.g. change from UPF1 to UPF2). The decision may be triggered by UE mobility and/or load balance. When the local PSA is relocated, a DNAI change may take place or not.

In step 307, the SMF reports the PSA change (may be represented by DNAI change) to the AF, e.g. by invoking "Nsmf_EventExposure_Notify" service operation.

In step 308, the AF acknowledges the report of the PSA change with related information (e.g. smf_EventExposure_AppRelocationInfo). The related information sent to the SMF may include indication on whether service continuity for offload traffic is supported or not for the PDU session.

As described above, the indication on whether service continuity for offload traffic is supported or not (for all existing PDU sessions) may be indicated in steps 301 and 302. If the indication on whether service continuity for offload traffic is supported or not for the PDU session is received in step 308, the SMF uses the indication received in step 308. Otherwise, the SMF uses the information received in step 302.

In step 309, the SMF decides whether service continuity is supported during the PSA relocation from UPF1 to UPF2 according to the information received in step 302 and/or in step 308.

In step 310, the SMF establishes the UPF2 for the PDU session for the local access to the L-DN.

In step 311, the SMF updates the ULCL for the PDU session. Two different situations may occur.

In a first situation, ULCL is relocated. That is, a new ULCL (e.g. ULCL2) is established for the PDU session so that UE is connected to UPF2 via the new ULCL (ULCL2).

Incidentally, UE is usually connected via a new access network (e.g. AN2) to the ULCL2. In this condition, AN is not used in the PDU session.

Figure 4C:
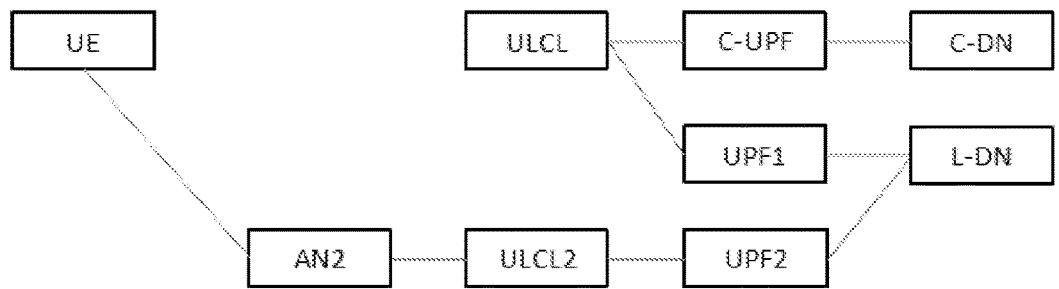

FIG. 4C shows the connection among the UE, the ULCL, the C-UPF, the C-DN, the UPF1, the AN2, the ULCL2, the UPF2 and the L-DN at this time.

After the ULCL2 is established for the PDU session, the C-UPF is updated to connect to the ULCL2.

Figure 4D:
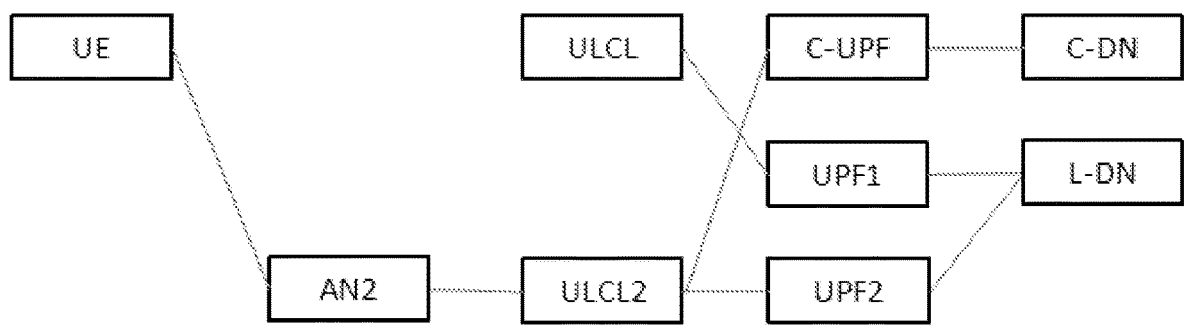

FIG. 4D shows the connection among the UE, the ULCL, the C-UPF, the C-DN, the UPF1, the AN2, the ULCL2, the UPF2 and the L-DN at this time.

When service continuity for offload traffic is supported, steps 312 and 313 are performed.

In step 312, a forwarding tunnel is established between the ULCL and the ULCL2. In consideration that the C-UPF is updated to connect to the ULCL2, the DL data packets sent to the ULCL can be forwarded to the ULCL2 using the forwarding tunnel.

Figure 4E:
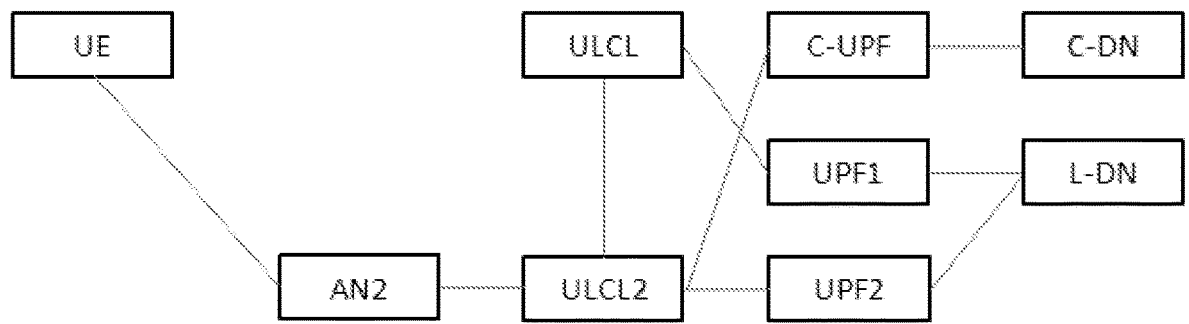

FIG. 4E shows the connection among the UE, the ULCL, the C-UPF, the C-DN, the UPF1, the AN2, the ULCL2, the UPF2 and the L-DN at this time.

In step 313, the forwarding tunnel is released based on policy. For example, the policy may be one of:
(1) when there is no data to be transmitted at the ULCL (i.e. detection of no active traffic);
(2) a preset timer expires; and
(3) indication from the AF.

In addition, the source PSA (UPF1) may send one or more "end marker" packets to the ULCL to indicate the last DL data packets transmitted from the UPF1 to the ULCL. The ULCL forwards the end marker packets to ULCL2 using the forwarding tunnel. If ULCL (e.g. ULCL2) supports reordering function, the "end marker" packets assist the reordering function at the ULCL2 to reorder the packets from the UPF1 through the forwarding tunnel and the packets from the UPF2 and the C-UPF. After the ULCL2 receives the end marker packets, the forwarding tunnel may be released.

As a whole, the forwarding tunnel ensures no data loss during the PSA relocation from UPF1 to UPF2 (as well as the relocation from ULCL to ULCL2).

Figure 4F:
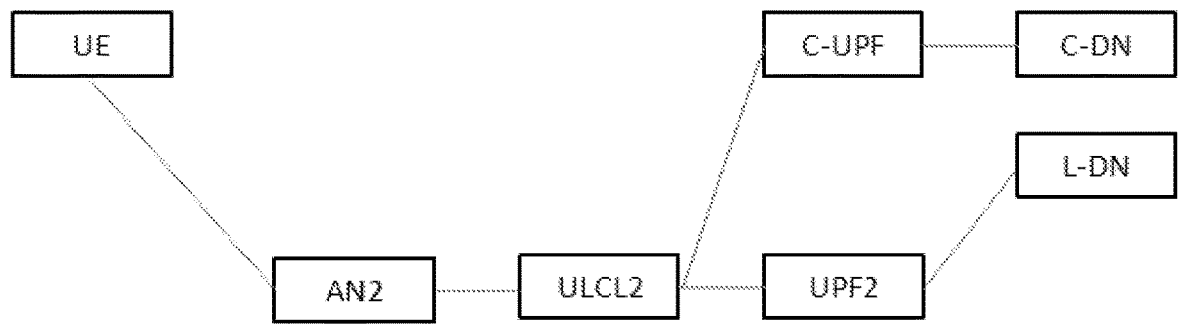

In step 314, the SMF releases the UPF1 for the PDU session. The ULCL is also released for the PDU session. FIG. 4F shows the connection among the UE, the AN2, the ULCL2, the C-UPF, the C-DN, the UPF2 and the L-DN at this time.

When service continuity for offload traffic is not supported, steps 312 and 313 are not performed. The SMF may release the UPF1 as well as the ULCL for the PDU session immediately after establishing UPF2 and ULCL2 for the PDU session and updating the C-UPF to connect to the ULCL2. That is, the connection shown in FIG. 4D will be changed directly to that shown in FIG. 4F. In this condition, some data may be lost.

Figure 4G:
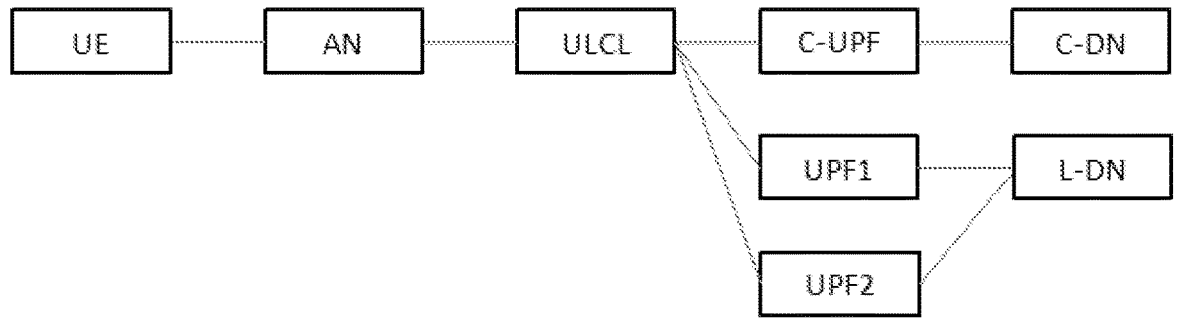

In step 311, in a second situation of updating the ULCL, the UE may connect to the UPF2 still with the ULCL. That is, the ULCL is not relocated. FIG. 4G shows the connection among the UE, the AN, the ULCL, the C-UPF, the C-DN, the UPF1, the UPF2 and the L-DN in the second situation at this time.

In the second situation, when service continuity for offload traffic is supported, a step 312a is performed. In the step 312a, the packets that had been transmitted to UPF1 are transmitted to the ULCL. In particular, one or more "end marker" packets may be sent to the ULCL to indicate the last DL data packets transmitted from the UPF1 to the ULCL.

Figure 4J:
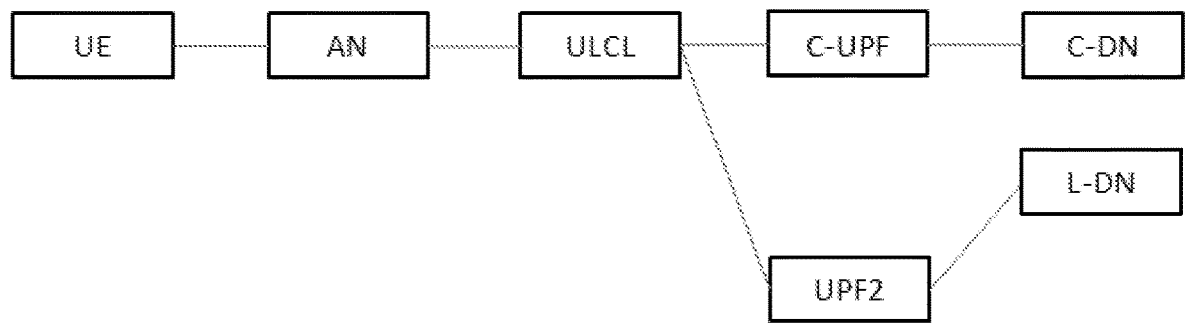

Similar to the first situation, in step 414, the SMF releases the UPF1 for the PDU session. FIG. 4J shows the connection among the UE, the AN, the ULCL, the C-UPF, the C-DN, the UPF2 and the L-DN at this time.

As whole, depending on whether service continuity for offload traffic is supported or not, the SMF performs the PSA relocation differently. When service continuity for offload traffic is determined as being supported in step 309, the steps 312 and 313 or the step 312a are performed to ensure no data loss. Incidentally, as the information including the indication on whether the service continuity for offload traffic is supported or not is received in step 302, the determination made in the step 309 may be at least partially performed in step 306 (i.e. determining whether service continuity for offload traffic is supported or not according to the information received in step 302). That is, when the related information received in the step 308 does not include the indication on whether service continuity for offload traffic is supported or not, the determination made in the step 306 applies. When service continuity for offload traffic is determined as not being supported in step 309, the steps 312 and 313 or the step 312a are not performed (that is, after performing the step 311, step 314 is performed).

In the first embodiment, the UE is not aware of the relocation of PSAs.

Figure 5:
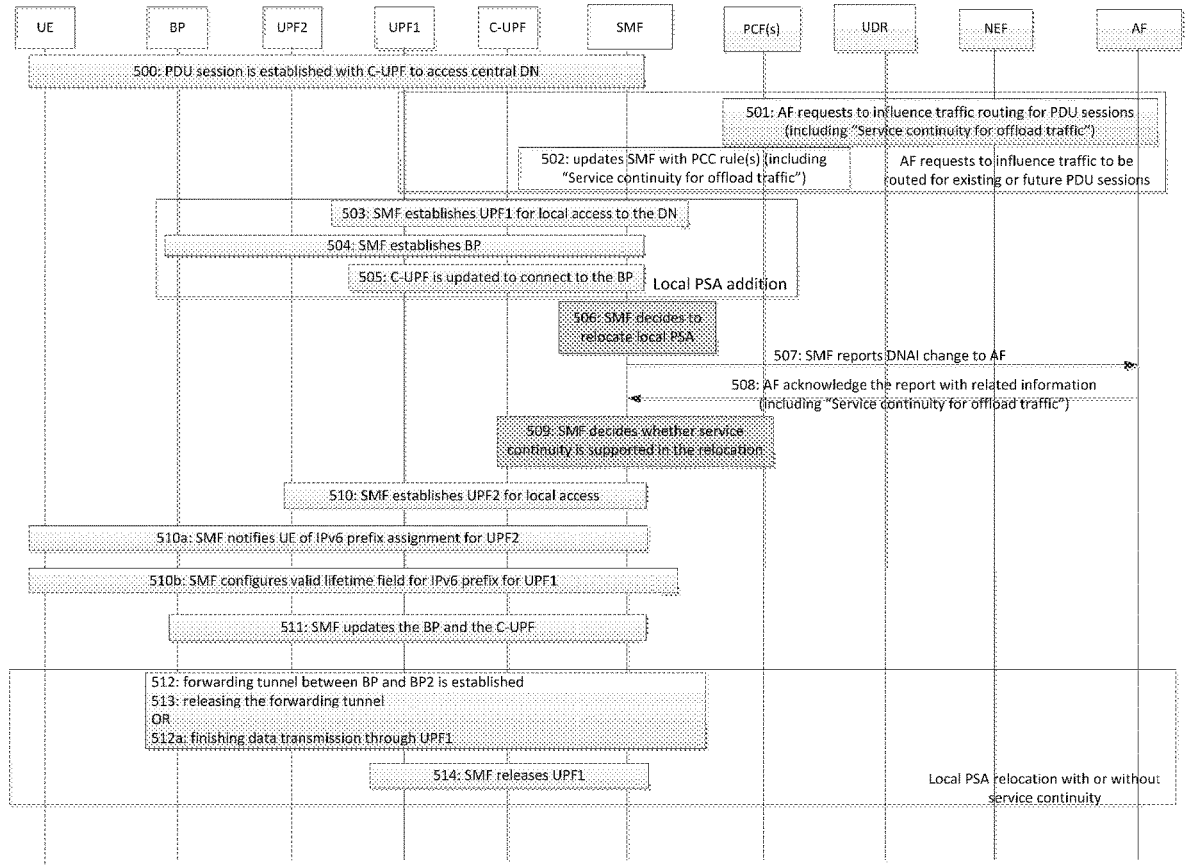
FIG. 5 illustrates a method of relocating local PSA for a PDU session according to a second embodiment.

FIG. 5 illustrates a method of relocating local PSA for a PDU session according to a second embodiment. In the second embodiment, branching point (BP) is used for routing data packets to different PSAs and merging data packets received from different PSAs.

As shown in FIG. 5, compared with FIG. 3, the entities in the second embodiment differ from those in the first embodiment in that the ULCL in FIG. 3 is replaced with BP in FIG. 5. The user plane path change according to the second embodiment is similar to that according to the first embodiment as shown in FIGS. 4A-4J, except that the ULCL (as well as ULCL2) will be replaced with BP (as well as BP2). Therefore, FIGS. 4A-4J may roughly reflect the user plane path change according to the second embodiment.

Steps 500-510 are similar to steps 300-310.

In particular, in step 500, a PDU session is established from the UE with the C-UPF to access a central DN. The SMF notifies the UE of the availability of a IPv6 prefix (IP@C) assigned for C-UPF, e.g. by using an IPv6 Router Advertisement message. The UE will use IP@C to send data packets through the C-UPF.

In step 501, the AF may request to influence traffic routing for PDU sessions. The AF request may include a new parameter "Service continuity for offload traffic" for indicating whether service continuity for offload traffic is supported or not. Alternatively, the indication on whether service continuity for offload traffic is supported or not may be implemented as an extension to the existing parameter "Application Relocation Possibility".

In step 502, the AF request may be sent to PCF directly or via NEF. The PCF updates the SMF with new PCC rule(s). The PCC rule contains a traffic steering control information per AF request which includes the indication on whether service continuity for offload traffic is supported or not. According to the second embodiment, when the service continuity for offload traffic is supported, no data loss is allowed for the offload traffic of the PDU sessions when the PSA and/or the BP are relocated. When the service continuity for offload traffic is not supported, some data loss is allowed for the offload traffic of the PDU sessions when the PSA and/or the BP are relocated. Incidentally, the service continuity for offload traffic may be the service continuity for local offload traffic.

In step 503, the SMF decides that some selective traffic should be routed to the DN via local PSA. Accordingly, for the PDU session, the SMF establishes UPF1 for a local access a local DN (i.e. local deployment of the DN, referred to as L-DN). In particular, the SMF notifies the UE of the availability of a IPv6 prefix (IP@1) assigned for UPF1, e.g. by using an IPv6 Router Advertisement message. The UE will use IP@1 to send data packets through the UPF1.

In step 504, the SMF establishes a BP for the PDU session to support data transmissions through multiple PSAs (i.e. UPF1 and C-UPF).

In step 505, the C-UPF is updated so that the C-UPF is connected to the BP.

In particular, the data packets with IPv6 prefix IP@C are routed by the BP to the C-UPF and the data packets with IPv6 prefix IP@1 are routed by the BP to the UPF1.

In step 506, the SMF decides to relocate the local PSA (e.g. change from UPF1 to UPF2) triggered by UE mobility and/or load balance.

In step 507, the SMF reports the PSA change (indicating the relocation of the local PSA) to the AF.

In step 508, the AF acknowledges the report of the PSA change with related information that may include indication on whether service continuity for offload traffic is supported or not. The related information is sent to the SMF.

In step 509, the SMF decides whether service continuity is supported for the relocation from UPF1 to UPF2 according to the information received in step 502 and/or in step 508.

In step 510, the SMF establishes the UPF2 for the PDU session for local access to the L-DN.

In step 510a, the SMF notifies the UE of the availability of a IPv6 prefix (IP@2) assigned for UPF2, e.g. by using an IPv6 Router Advertisement message. The UE will use IP@2 to send data packets through the UPF2.

In step 510b, the SMF sends a second Router Advertisement to the UE via the old PSA (UPF1) with the old prefix (IP@1) to set preferred lifetime for IP@1. In particular, if service continuity for offload traffic is supported in relocation of the local PSA, the preferred lifetime field is set to zero, and a value is set to the valid lifetime field according to RFC 4862. The valid lifetime value indicates the time period during which the SMF is willing to keep the old prefix (IP@1). On the other hand, if service continuity for offload traffic is not supported in relocation of the local PSA, the preferred lifetime field and the valid lifetime field are both set to zero according to RFC 4862. When the valid lifetime value is set to zero, the old prefix (IP@1) will become invalid immediately.

In step 511, the SMF updates the BP for the PDU session. Two different situations may occur.

In a first situation, BP is relocated. That is, a new BP (e.g. BP2) is established for the PDU session so that UE is connected to UPF2 via the new BP (BP2). Incidentally, UE is usually connected via a new access network (e.g. AN2) to the BP2. In this condition, AN is not used in the PDU session.

After the BP2 is established for the PDU session, the C-UPF is updated to connect to the BP2.

When service continuity for offload traffic is supported, steps 512 and 513 are performed.

In step 512, a forwarding tunnel is established between the BP and the BP2. In consideration that the C-UPF is updated to connect to the BP2, the DL data packets sent to the BP can be forwarded to the BP2 using the forwarding tunnel.

In step 513, the forwarding tunnel may be released based on policy. For example, the policy may be one of:
(1) when there is no data to be transmitted at the BP (i.e. detection of no active traffic);
(2) a preset timer expires; and
(3) indication from the AF.

In addition, the source PSA (UPF1) may send one or more "end marker" packets to the BP to indicate the last DL data packets transmitted from the UPF1 to the BP. The BP forwards the end marker packets to BP2 using the forwarding tunnel. If BP (e.g. the BP2) supports reordering function, the "end marker" packets assist the reordering function at the BP2 to reorder the packets from the UPF1 through the forwarding tunnel and the packets from the UPF2 and the C-UPF. After the BP2 receives the end marker packets, the forwarding tunnel may be released.

In step 514, the SMF releases the UPF1 for the PDU session. The BP is also released for the PDU session.

When service continuity for offload traffic is not supported, steps 512 and 513 are not performed. The SMF may release the UPF1 as well as the BP for the PDU session immediately after establishing UPF2 and BP2 for the PDU session and updating the C-UPF to connect to the BP2.

In step 511, in a second situation of updating the BP, the UE may connect to the UPF2 still with the BP. That is, the BP is not relocated.

In the second situation, when service continuity for offload traffic is supported, a step 512a is performed. In the step 512a, the packets that had been transmitted to UPF1 are transmitted to the BP within the valid lifetime value. In particular, one or more "end marker" packets may be sent to the BP to indicate the last DL data packets transmitted from the UPF1 to the BP.

Similar to the first situation, in step 514, the SMF releases the UPF1 for the PDU session.

As a whole, depending on whether service continuity for offload traffic is supported or not, the SMF performs the PSA relocation differently. When service continuity for offload traffic is determined as being supported in step 509, the steps 512 and 513 or the step 512a are performed to ensure no data loss. Incidentally, as the information including the indication on whether the service continuity for offload traffic is supported or not is received in step 502, the determination made in the step 509 may be at least partially performed in step 506 (i.e. determining whether service continuity for offload traffic is supported or not according to the information received in step 502). That is, when the related information received in the step 508 does not include the indication on whether service continuity for offload traffic is supported or not, the determination made in the step 506 applies. When service continuity for offload traffic is determined as not being supported in step 309, the steps 512 and 513 or the step 512a are not performed (that is, after performing the step 511, step 514 is performed).

Figure 6:
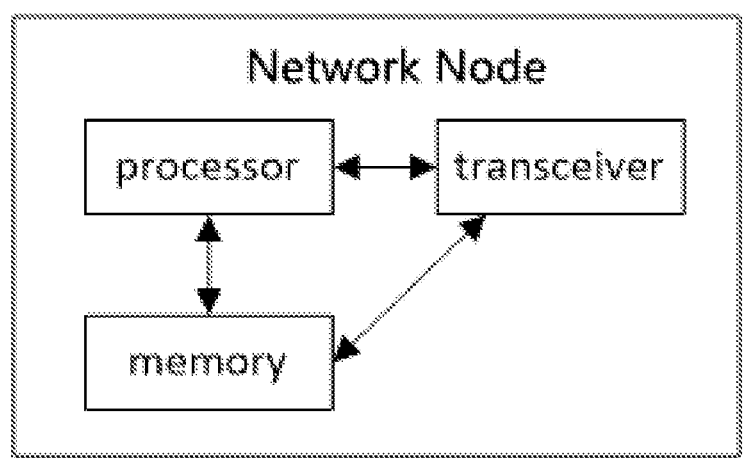
FIG. 6 is a schematic block diagram illustrating an apparatus according to one embodiment.

FIG. 6 is a schematic block diagram illustrating apparatuses according to one embodiment.

Referring to FIG. 6, the network function (e.g. SMF) includes a processor, a memory, and a transceiver. The processor implements a function, a process, and/or a method. The memories are connected with the processors to store various pieces of information for driving the processors. The transceivers are connected with the processors to transmit and/or receive message or information. Needless to say, the transceiver may be implemented as a transmitter to transmit the information and a receiver to receive the information.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a network function, the method comprising:
    receiving a charging and policy control (PCC) rule containing a traffic steering control information per application function (AF) request which includes an indication on whether service continuity for offload traffic is supported or not; and
    performing a protocol data unit (PDU) session anchor (PSA) relocation based on the information, wherein, if the indication indicates that the service continuity for offload traffic is supported and a source PSA is relocated to a target PSA,
    if the source PSA is connected to a source uplink (UL) classifier (ULCL) or branching point (BP) and the target PSA is connected to a target ULCL or BP,
    a forwarding tunnel is established between the source ULCL or BP and the target ULCL or BP,
    wherein the indication is included in an AF request received from an AF as an independent parameter.

2. The method of claim 1, wherein, the PCC rule is received from a policy control function (PCF).

3. The method of claim 1, wherein the indication is included in an acknowledge response to the PSA relocation.

4. The method of claim 1, wherein, the forwarding tunnel is released when the target ULCL or BP receives one or more end marker packets.

5. The method of claim 1, wherein, if the indication indicates that the service continuity for offload traffic is supported and a source PSA is relocated to a target PSA, if the source PSA and the target PSA are both connected to a source ULCL or BP, the source PSA is released after the source ULCL or BP receives one or more end marker packets from the source PSA.

6. The method of claim 1, wherein, if the indication indicates that the service continuity for offload traffic is not supported and a source PSA is changed to a target PSA, if the source PSA is connected to a source ULCL or BP and the target PSA is connected to a target ULCL or BP, the source PSA and the source ULCL or BP are released immediately after the target PSA and the target ULCL or BP are established.

7. The method of claim 1, wherein, if the indication indicates that the service continuity for offload traffic is not supported and a source PSA is changed to a target PSA, if the source PSA and the target PSA are both connected to a source ULCL or BP, the source PSA is released immediately after the target PSA is established.

8. The method of claim 1, wherein, if a source PSA is relocated to a target PSA where a BP is used to support data transmissions through multiple PSAs, the method further comprising: notifying a user equipment (UE) of a first IPv6 prefix assigned for the target PSA; and notifying the UE of a valid lifetime value for a second IPv6 prefix assigned for the source PSA.

9. The method of claim 8, wherein, if the indication indicates that the service continuity for offload traffic is not supported, the valid lifetime value for the second IPv6 prefix assigned for the source PSA is set to zero.

10. An apparatus for performing a network function, the apparatus comprising:
    at least one memory; and
    at least one processor coupled with the at least one memory and configured to cause the apparatus to:
        receive a charging and policy control (PCC) rule containing a traffic steering control information per application function (AF) request which includes an indication on whether service continuity for offload traffic is supported or not; and
        perform a protocol data unit (PDU) session anchor (PSA) relocation based on the information,
        wherein, if the indication indicates that the service continuity for offload traffic is supported and a source PSA is relocated to a target PSA,
        if the source PSA is connected to a source uplink (UL) classifier (ULCL) or branching point (BP) and the target PSA is connected to a target ULCL or BP,
        a forwarding tunnel is established between the source ULCL or BP and the target ULCL or BP,
        wherein the indication is included in an AF request received from an AF as an independent parameter.

11. The apparatus of claim 10, wherein the PCC rule is received from PCF.

12. The apparatus of claim 10, wherein the indication is included in an acknowledge response to the PSA relocation.

13. The apparatus of claim 10, wherein, the forwarding tunnel is released when the target ULCL or BP receives one or more end marker packets.

14. The apparatus of claim 10, wherein, if the indication indicates that the service continuity for offload traffic is supported and a source PSA is relocated to a target PSA, if the source PSA and the target PSA are both connected to a source ULCL or BP, the source PSA is released after the source ULCL or BP receives one or more end marker packets from the source PSA.

15. The apparatus of claim 10, wherein, if the indication indicates that the service continuity for offload traffic is not supported and a source PSA is changed to a target PSA, if the source PSA is connected to a source ULCL or BP and the target PSA is connected to a target ULCL or BP, the source PSA and the source ULCL or BP are released immediately after the target PSA and the target ULCL or BP are established.

16. An apparatus for performing a network function, the apparatus comprising:
at least one memory; and
at least one processor coupled with the at least one memory and configured to cause the apparatus to:
transmit a charging and policy control (PCC) rule containing a traffic steering control information per application function (AF) request which includes an indication on whether service continuity for offload traffic is supported or not,
wherein a protocol data unit (PDU) session anchor (PSA) relocation is performed based on the information, and
wherein, if the indication indicates that the service continuity for offload traffic is supported and a source PSA is relocated to a target PSA,
if the source PSA is connected to a source uplink (UL) classifier (ULCL) or branching point (BP) and the target PSA is connected to a target ULCL or BP,
a forwarding tunnel is established between the source ULCL or BP and the target ULCL or BP,
wherein the indication is included in an AF request received from an AF as an independent parameter.

17. A method performed by a network function, the method comprising:
transmitting a charging and policy control (PCC) rule containing a traffic steering control information per application function (AF) request which includes an indication on whether service continuity for offload traffic is supported or not,
wherein a protocol data unit (PDU) session anchor (PSA) relocation is performed based on the information, and
wherein, if the indication indicates that the service continuity for offload traffic is supported and a source PSA is relocated to a target PSA,
if the source PSA is connected to a source uplink (UL) classifier (ULCL) or branching point (BP) and the target PSA is connected to a target ULCL or BP,
a forwarding tunnel is established between the source ULCL or BP and the target ULCL or BP,
wherein the indication is included in an AF request received from an AF as an independent parameter.

* * * * *